United States Patent [19]
Wang et al.

[11] Patent Number: 6,123,557
[45] Date of Patent: Sep. 26, 2000

[54] AUTOMATIC OPENING MECHANISM FOR DOCKING STATION CONNECTOR COVER

[75] Inventors: Shih-Kai Wang, Taipei; Yu-Chen Wu, Hua-Lien, both of Taiwan

[73] Assignee: Inventec Corporation, Taipei, Taiwan

[21] Appl. No.: 09/280,866

[22] Filed: Mar. 29, 1999

[51] Int. Cl.[7] .................................................. H01R 13/44

[52] U.S. Cl. .......................................... 439/137; 439/145

[58] Field of Search .................................... 439/137, 136, 439/138, 145, 159; 361/686; 395/525

[56] References Cited

U.S. PATENT DOCUMENTS

| | | | |
|---|---|---|---|
| 5,313,596 | 5/1994 | Swindler et al. | 395/325 |
| 5,552,959 | 9/1996 | Penniman et al. | 361/686 |
| 5,619,398 | 4/1997 | Harrrison et al. | 361/686 |
| 5,694,292 | 12/1997 | Paulsel et al. | 361/686 |
| 5,864,294 | 1/1999 | Hsu et al. | 340/635 |
| 6,011,687 | 1/2000 | Gluskoter et al. | 361/686 |

*Primary Examiner*—Lincoln Donovan
*Assistant Examiner*—Chandrika Prasad
*Attorney, Agent, or Firm*—Christensen O'Connor Johnson & Kindness PLLC

[57] ABSTRACT

A mechanism for automatically opening a docking connector cover (DCC) of a portable computer is provided. A docking station is provided with a boss projecting therefrom. A cover of a portable computer (300) includes an activation hole (111) for receiving the boss therethrough when the computer is docked onto the docking station. The cover further includes a connecting bar (105) slideably mounted thereon, including an angled end (106) and a first hook (220). The cover also includes a DCC (200) for selectively covering a connector slot of the computer. The DCC is mounted on the cover to be slideable in a direction generally perpendicular to the sliding direction of the connecting bar. The DCC includes a second hook (150*a*) selectively engageable with the first hook of the connecting bar, and the second hook is attached to a biasing means, such as a spring 170. When the DCC is closed, the first hook of the connecting bar and the second hook of the DCC are engaged with each other. When the computer is docked onto the docking station, the boss projects through the activation hole through the computer cover to thereby contact the angled end of the connecting bar to slide the connecting bar in a first direction (130*a*). This causes the first hook of the connecting bar to be disengaged from the second hook of the DCC, and further causes the DCC to be pulled in a second direction (130*b*) by the biasing means into an open position, to allow the connector slot of the computer to be connected to a connector slot of the docking station.

16 Claims, 5 Drawing Sheets

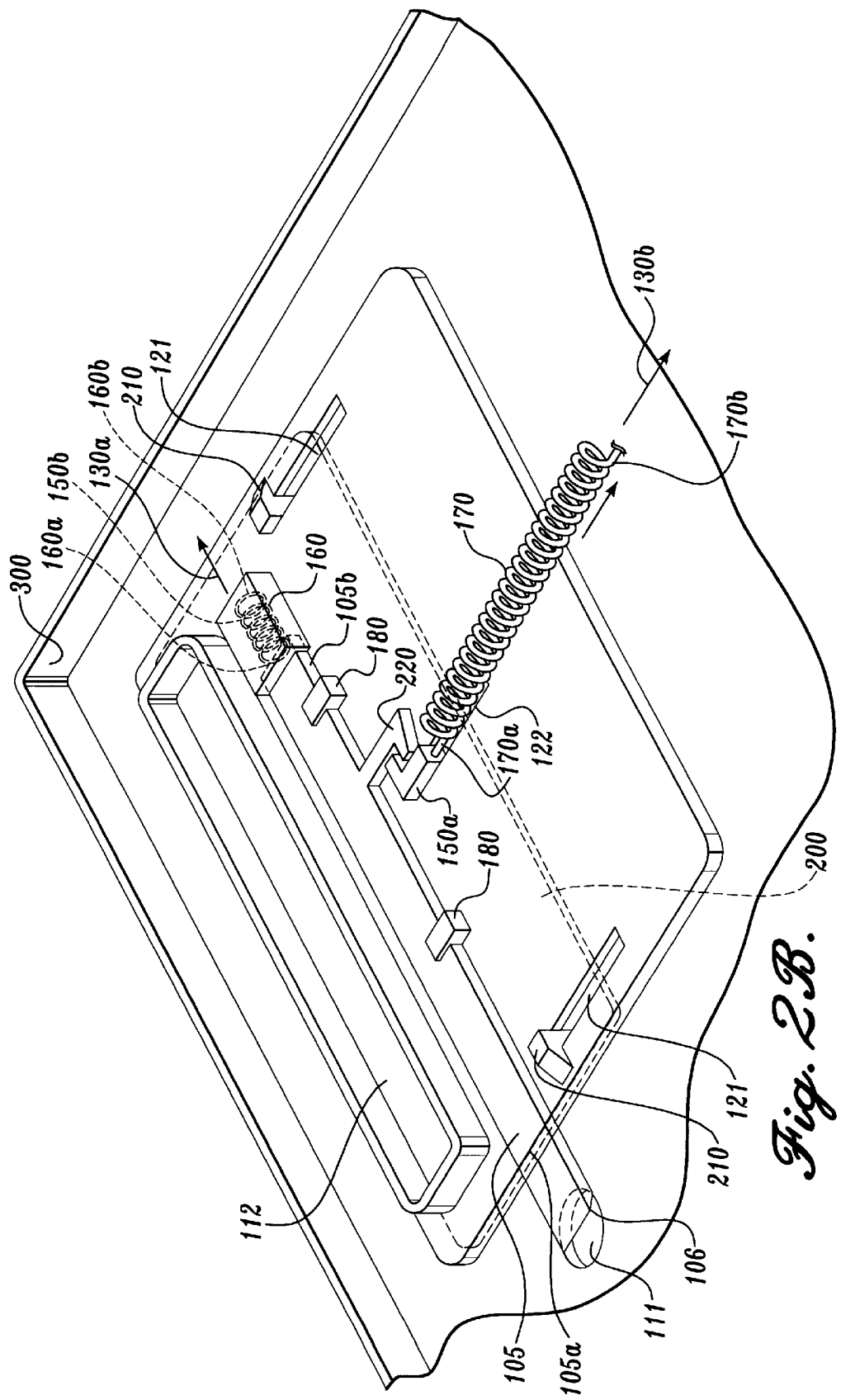

AUTOMATIC OPENING MECHANISM FOR DOCKING STATION CONNECTOR COVER

FIELD OF THE INVENTION

This invention relates to an opening mechanism for a docking station connector cover and, more specifically, to a mechanism for automatically opening a docking station connector cover of a portable computer for connecting the computer to a docking station.

BACKGROUND OF THE INVENTION

Portable computers, such as notebook- and laptop-computers, have become common in recent years. To achieve lightweight, compact portable computers, some of the computers' conventional functions have been removed, and delegated to various external devices. To add these functions back to a portable computer, a user must connect the portable computer to a docking station that includes various devices, such as digital camera adapters, network cards, CDs, and PCMCIA cards.

Many portable computers include a connector slot on the bottom of a portable computer, and the connector slot is usually covered by a docking connector cover (hereinafter DCC). Conventionally, a user is required to manually open the DCC to expose the connector slot to connect a docking station thereto. This has often resulted in damage done to the connector slot or to the DCC due to improper handling or opening of the DCC.

FIGS. 1A and 1B illustrate a conventional DCC 10 in a front view (i.e., as seen from the bottom cover side of a portable computer), and in a rear view, respectively. The function of DCC 10 is to protect a connector slot of a portable computer from undue exposure. A slot opening 20 is provided through the bottom cover of the computer to expose the connector slot therethrough. DCC 10 is slideably mounted to the bottom cover of the computer using one or more guide hooks 30 that slide along a guide slot 50 provided through the bottom cover.

Accordingly, to connect a docking station to a portable computer, a user must manually open DCC 10 located on the bottom cover of the computer to expose the connector slot of the computer. As noted above, some users may accidentally damage the connector slot or the DCC by opening the DCC improperly. Therefore, the present invention provides a DCC opening mechanism, which allows for automatic opening of a DCC, thereby preventing damages to the connector slot or the DCC.

SUMMARY OF THE INVENTION

The present invention provides a mechanism for automatically opening a docking connector cover (DCC) of a portable computer when the computer is docked onto a docking station, to allow a first connector slot of the computer to be connected to a second connector slot of the docking station.

A docking station is provided with a boss projecting therefrom.

A cover of a portable computer includes a corresponding activation hole for receiving the boss therethrough when the computer is docked onto the docking station. The cover further includes a connecting bar slideably mounted thereon, including an angled end and a first hook. The cover also includes a DCC for selectively covering the first connector slot of the computer. The DCC is mounted on the cover to be slideable in a direction generally perpendicular to the sliding direction of the connecting bar. The DCC includes a second hook selectively engageable with the first hook of the connecting bar, and the second hook is attached to a biasing means, such as a spring.

When the DCC is closed, the first hook of the connecting bar and the second hook of the DCC are engaged with each other. When the computer is docked onto the docking station, the boss projects through the activation hole through the computer cover to thereby contact the angled end of the connecting bar to slide the connecting bar. This causes the first hook of the connecting bar to be disengaged from the second hook of the DCC, and further causes the DCC to be pulled by the biasing means into an open position.

Accordingly, the present invention automatically opens a DCC to allow a first connector slot of a portable computer to be connected to a second connector slot of a docking station.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 2B illustrates an automatic opening mechanism provided on a bottom cover of a portable computer, in accordance with the present invention;

DETAILED DESCRIPTION OF THE PREFERRED EMBODIMENT

The present invention relates to a mechanism for automatically opening a docking connector cover (DCC) that is used to protect a connector slot of a portable computer. In the following description, most components used in connection with the automatic DCC opening mechanism of the present invention are located on the bottom cover of a portable computer, while some other components of the mechanism are located on a docking station to be connected to the computer.

Figure 1A:
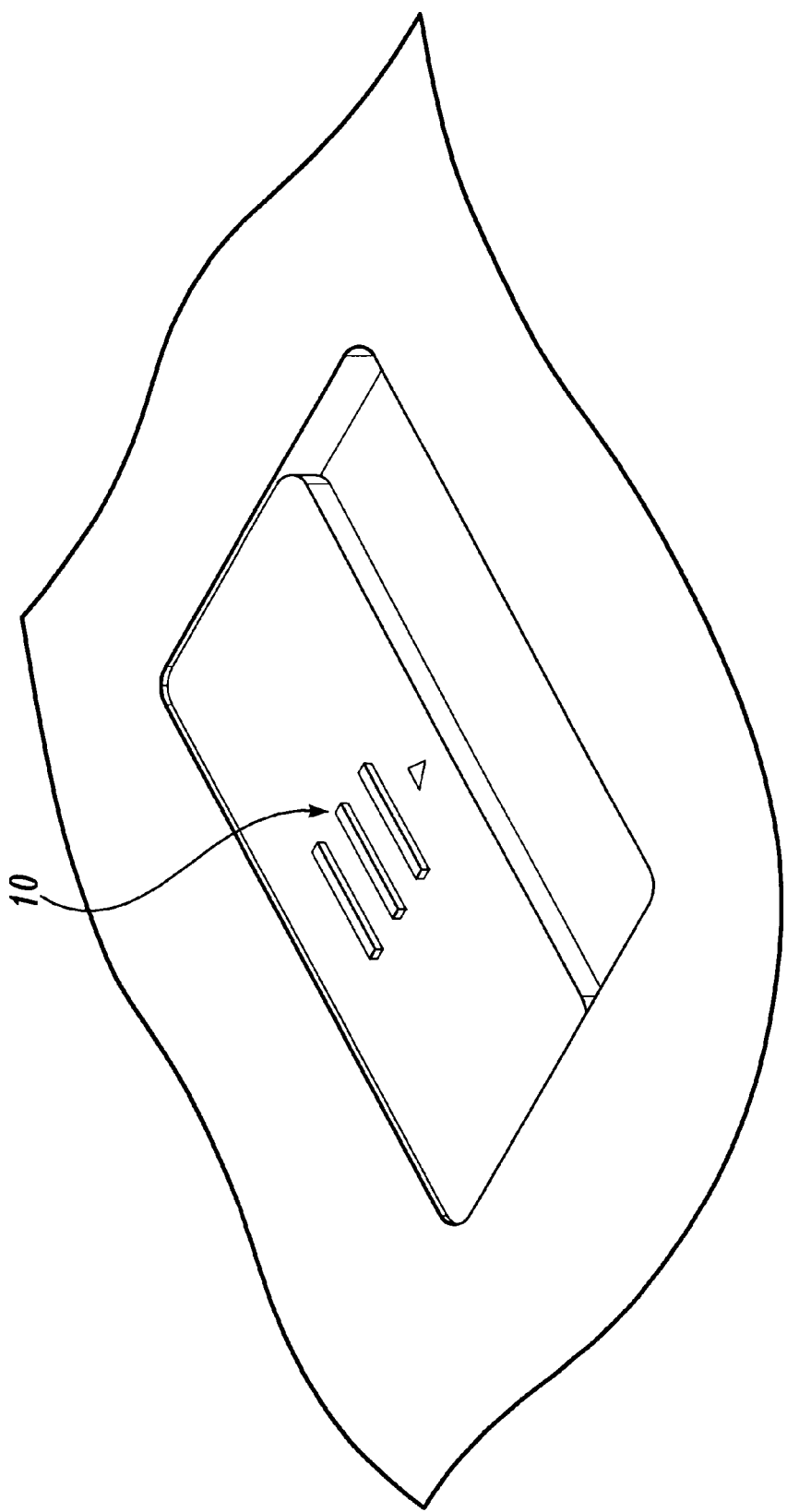
FIG. 1A is a front view of a conventional docking connector cover (DCC) located on the bottom cover of a portable computer.
Figure 1B:
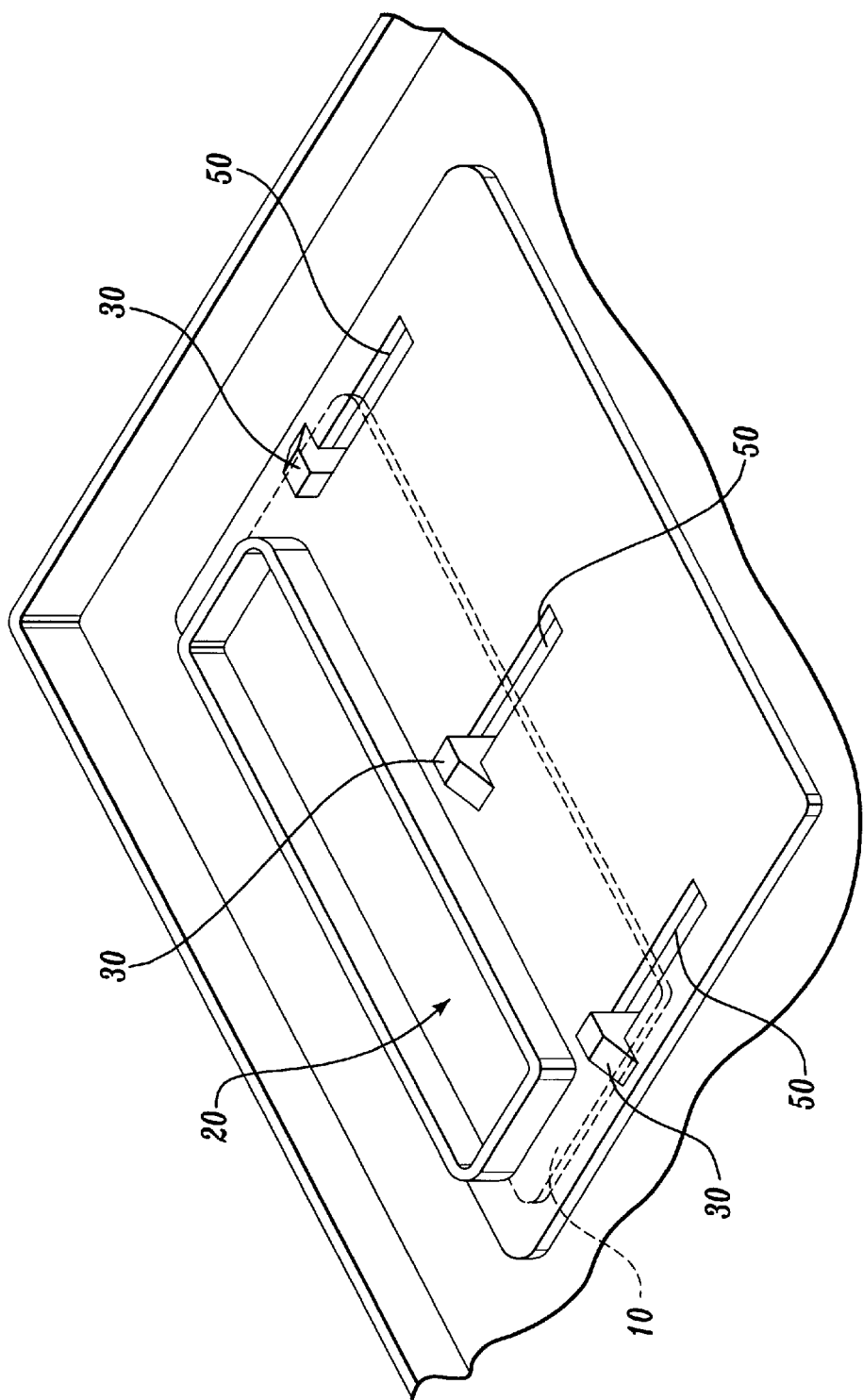
FIG. 1B is a rear view of FIG. 1A.
Figure 2A:
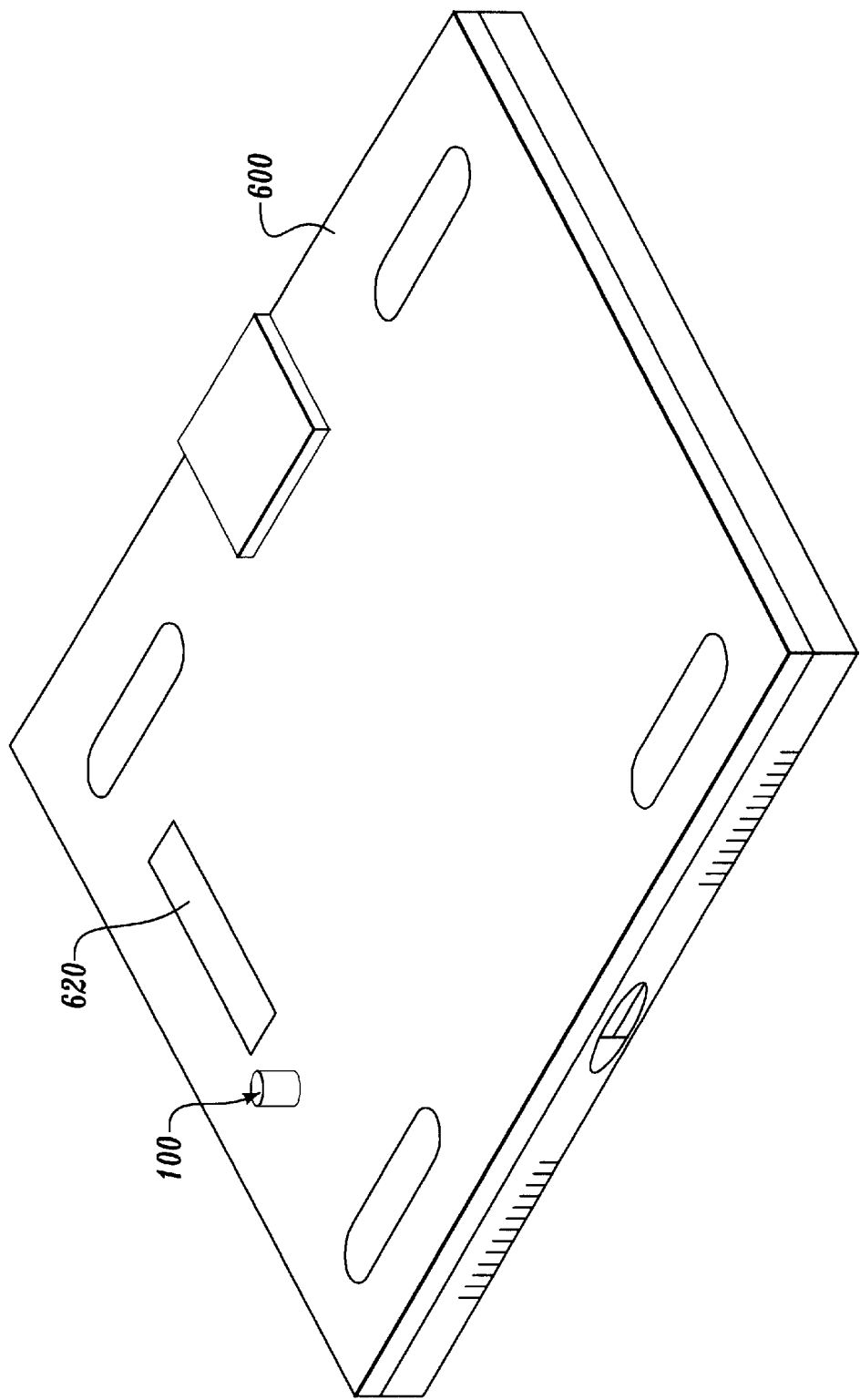
FIG. 2A illustrates a docking station including a boss, suitable for use with the present invention.

Referring to FIG. 2A, a docking station 600 suitable for use with the present invention includes a boss 100 projecting therefrom.

Referring to FIG. 2B, a bottom cover of a portable computer 300 includes an activation hole 111 defined therethrough. The activation hole 111 is shaped to generally match the cross section of the boss 100. The diameter of the activation hole 111 is greater than that of the boss 100 to receive the boss 100 therethrough. Though the boss 100 and the activation hole 111 are both illustrated to have a circular cross-section, it should be understood that they may take any other cross-sectional shapes as long as the activation hole 111 is shaped and sized so as to receive the boss 100 therethrough. A connecting bar 105, having a first end 105a, a second end 105b, and a connecting bar hook (a first hook)

220, is slideably supported on a rear side of the bottom cover by guiding hooks 180 having a generally L-shaped cross section. The first end 105a of the connecting bar 105 includes an angled end 106 so that, when the boss 100 of the docking station 600 projects through the activation hole 111 of the portable computer 300, the boss 100 contacts the angled end 106 and moves the connecting bar 105 in a first direction indicated by an arrow 130a. The bottom cover of the portable computer 300 further includes a slot opening 112 for exposing a first connector slot (not shown) of the portable computer therethrough to be connected with a second connector slot 620 (see FIG. 2A) of the docking station.

Still referring to FIG. 2B, a first guide slot 121, and preferably two first guide slots, are provided through the bottom cover of the portable computer. A second guide slot 122 is provided between the two first guide slots 121. A docking connector cover (DCC) 200, shown in a dotted line, is provided to protect the first connector slot (not shown) of the portable computer from exposure. The DCC 200 includes a guide 210 and a second hook 150a. The guide 210 is slideably supported by the first guide slot 121 provided through the bottom cover of the computer 300. The second hook 150a is integrally formed with the DCC 200, and is slideably mounted onto the second guide slot 122. When the connecting bar hook 220 of the connecting bar 105 is engaged with the second hook 150a of the DCC 200, the DCC 200 is in a closed position.

Still referring to FIG. 2B, the bottom cover of the portable computer 300 further includes a housing 150b for receiving the second end 105b of the sliding connecting bar 105 therein. A first biasing means 160, preferably a spring, including a first end 160a and a second end 160b is provided. The first and second ends 160a, 160b of the first biasing means 160 are attached to the second end 105b of the connecting bar 105 and the housing 150b, respectively. When the connecting bar 105 is pushed toward the first direction of 130a, the first biasing means, or a spring 160, is compressed. When the boss 100 is removed from the activation hole 111 and detached from the angled end 106 of the connecting bar 105, the first biasing means 160 returns to its original state.

A second biasing means 170, preferably a spring, including a first end 170a and a second end 170b is provided. The first and second ends 170a, 170b of the second biasing means 170 are connected to the second hook 150a of the DCC 200 and the bottom cover of the portable computer 300, respectively. When the connecting bar hook 220 is disengaged from the second hook 150a, the second biasing means 170 is at its original state. When the boss 100 projects through the activation hole 111 and touches the angled end 106 of the connecting bar 105, the end of the boss 100 pushes the connecting bar 105 so that the connecting bar hook 220 becomes detached from the second hook 150a. At this time, the retracting force of the second biasing means, or spring 170, pulls the DCC 200 in a second direction indicated by an arrow 130b, to its open position.

Figure 3A:
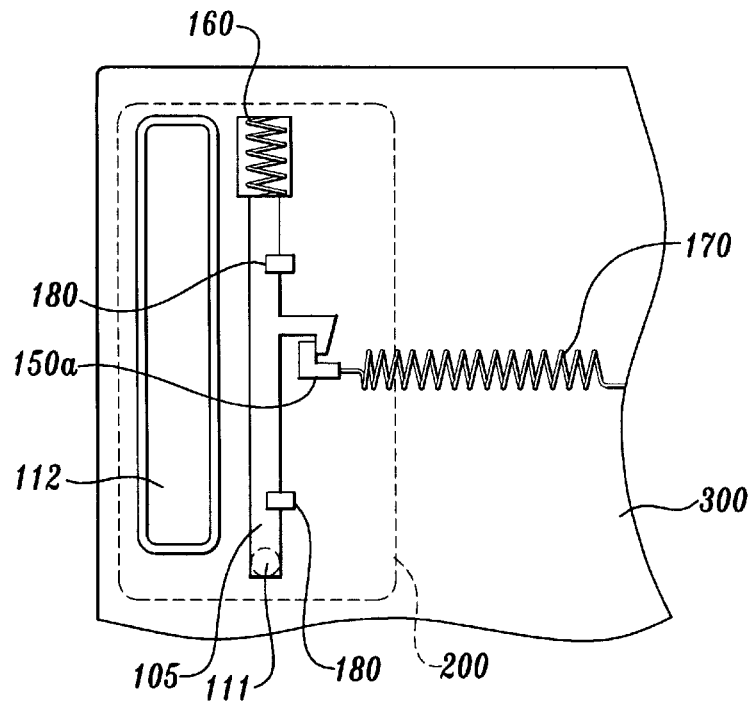
FIG. 3A illustrates the automatic opening mechanism of FIG. 2B in a closed position.
Figure 3B:
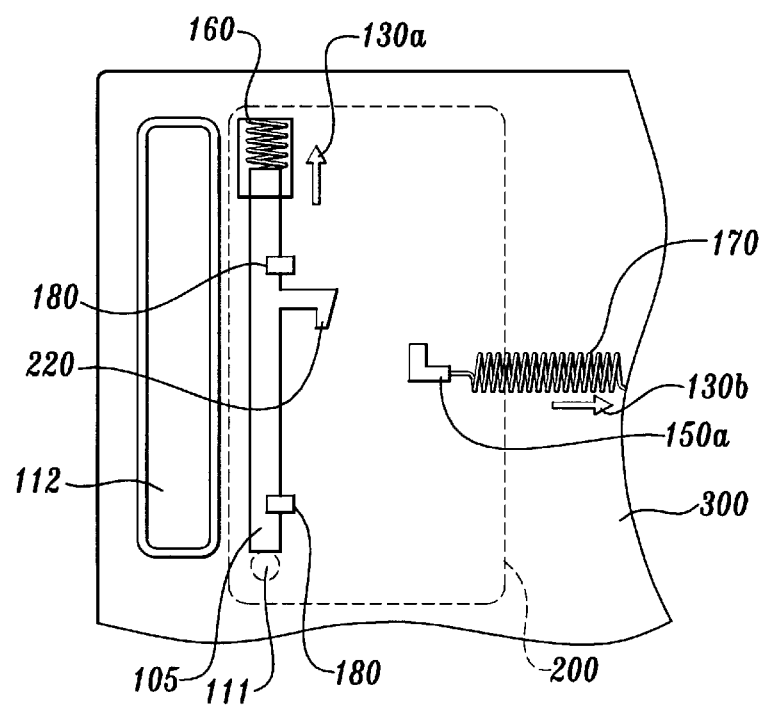
FIG. 3B illustrates the automatic opening mechanism of FIG. 2B in an open position.

Operation of the present invention is described in reference to FIGS. 3A and 3B. It should be understood that FIGS. 3A and 3B illustrate only components necessary to illustrate opening and closing operations of the DCC 200, and do not include other components used in the present mechanism for simplicity purposes. FIG. 3A illustrates the DCC 200 in its closed position, and FIG. 3B illustrates the same in its open position. When a docking station is connected to the portable computer 300, the boss 100 of the docking station projects through the activation hole 111 provided through the bottom cover of the portable computer 300. When the boss 100 passes through the activation hole 111, the boss 100 contacts the angled end 106 of the connecting bar 105, thereby causing connecting bar 105 to slide toward the first direction 130a, to detach the connecting bar hook 220 from the second hook 150a of the DCC 200. Because the second hook 150a is linked to the first end 170a of the second biasing means, or spring 170, and the DCC 200 and the second hook 150a are integrally formed, the DCC 200 will then be pulled toward the second direction 130b by the second biasing means 170. The DCC 200 is now opened. At this time, the first connector slot (not shown) of the computer 300 may be connected with the second connector slot 620 of the docking station 600 (See FIG. 2A).

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An automatic opening mechanism for a docking station connector cover of a portable computer, for connecting a first connector slot of the portable computer to a second connector slot of a docking station, comprising:

(a) a boss projecting from the docking station;
(b) a computer cover including:
an activation hole defined through the computer cover, the activation hole being shaped and sized for receiving the boss therethrough,
a slot opening defined through the computer cover for exposing the first connector slot of the portable computer therethrough,
a connecting bar slideably mounted on the computer cover to be slideable in a first direction, the connecting bar having a first end, a second end, and a first hook, the first end being adapted so as to slide the connecting bar when the boss of the docking station projects through the activation hole of the computer cover to contact the first end,
a first biasing means having a first end and a second end, the first end being attached to the second end of the connecting bar, the second end being attached to the computer cover,
a docking connector cover for covering the first connector slot, the docking connector cover slideably supported on the computer cover to be slideable in a second direction, the docking connector cover further including a second hook adapted to be selectively engageable with the first hook of the connecting bar, and
a second biasing means having a first end and a second end, the first end being attached to the second hook, the second end being attached to the computer cover;
wherein, as the boss of the docking station projects through the activation hole of the computer cover, the boss contacts the first end thereby causing the connecting bar to slide in the first direction to disengage the first hook from the second hook of the docking connector cover, further causing the docking connector cover to be pulled by the second biasing means into an open position.

2. The mechanism of claim 1, wherein the computer cover defines a guide slot extending in the second direction, and the docking connector cover include a guide to be slideably mounted to the guide slot so as to slideably support the docking connector cover on the computer cover.

3. The mechanism of claim 2, wherein two guide slots are defined through the computer cover, and the computer connector cover includes two guides to be slideably mounted on the two guide slots, respectively.

4. The mechanism of claim 1, wherein the first end of the connecting bar is an angled end.

5. The mechanism of claim 1, wherein the first and second directions are generally perpendicular with each other.

6. The mechanism of claim 1, wherein the computer cover defines a guide slot extending in the second direction, and the second hook of the docking connector cover is slideably mounted to the guide slot so as to slideably support the docking connector cover on the computer cover.

7. The mechanism of claim 1, wherein the computer cover includes a guiding hook adapted to slideably support the connecting bar on the computer cover.

8. The mechanism of claim 1, wherein the first and second biasing means comprise springs.

9. The mechanism of claim 1, wherein the computer cover is a bottom cover of the portable computer.

10. An automatic opening mechanism for a docking station connector cover of a portable computer, for connecting a first connector slot of the portable computer to a second connector slot of a docking station, comprising:

(a) a boss projecting from the docking station;
(b) a computer cover including:
   an activation hole defined through the computer cover, the activation hole being shaped and sized for receiving the boss therethrough,
   a slot opening defined through the computer cover for exposing the first connector slot of the portable computer therethrough,
   a first guide slot defined through the computer cover, the first guide slot extending in a first direction,
   a connecting bar slideably mounted on the computer cover extending in a second direction generally perpendicularly to the first direction, the connecting bar having a first end, a second end, and a first hook, the first end being adapted so as to slide the connecting bar in the second direction when the boss of the docking station projects through the activation hole of the computer cover to contact the first end,
   a first biasing means having a first end and a second end, the first end being attached to the second end of the connecting bar, the second end being attached to the computer cover,
   a docking connector cover for covering the first connector slot, the docking connector cover including a second hook adapted to be slideably mounted to the first guide slot of the computer cover, the second hook being adapted to be selectively engageable with the first hook of the connecting bar, and
   a second biasing means having a first end and a second end, the first end being attached to the second hook of the docking connector cover, the second end being attached to the computer cover;
wherein, as the boss of the docking station projects through the activation hole of the computer cover, the boss contacts the first end of the connecting bar thereby causing the connecting bar to slide to disengage the first hook from the second hook of the docking connector cover, further causing the docking connector cover to be pulled by the second biasing means into an open position.

11. The mechanism of claim 10, wherein the computer cover further defines a second guide slot that extends parallel with the first guide slot, and the docking connector cover includes a second guide to be slideably mounted to the second guide slot so as to slideably support the docking connector cover on the computer cover.

12. The mechanism of claim 11, wherein two second guide slots are defined through the computer cover, the two second guide slots sandwiching the first guide slot therebetween, and the docking connector cover includes two second guides to be slideably mounted to the two second guide slots, respectively.

13. The mechanism of claim 10, wherein the first end of the connecting bar is an angled end.

14. The mechanism of claim 10, wherein the computer cover includes a guiding hook adapted to slideably support the connecting bar on the computer cover.

15. The mechanism of claim 10, wherein the first and second biasing means comprise springs.

16. The mechanism of claim 10, wherein the computer cover is a bottom cover of the portable computer.

* * * * *

UNITED STATES PATENT AND TRADEMARK OFFICE
CERTIFICATE OF CORRECTION

PATENT NO. : 6,123,557
DATED : September 26, 2000
INVENTOR(S) : S.-K. Wang et al.

It is certified that error appears in the above-identified patent and that said Letters Patent is hereby corrected as shown below:

Column 1,
Item [30], Foreign Application Priority Data, insert in appropriate order the following:
-- Foreign Application Priority Data Dec. 2, 1998 [TW] Taiwan 87220100 --

Item [56], Refs. Cited (U.S. Pats., Item 3), "Harrrison" should read -- Harrison --

Column 4,
Line 63, (Claim 2, line 3), "include" should read -- includes --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*